US008488839B2

(12) United States Patent
Sharon et al.

(10) Patent No.: US 8,488,839 B2
(45) Date of Patent: *Jul. 16, 2013

(54) COMPUTER PROGRAM AND APPARATUS FOR MOTION-BASED OBJECT EXTRACTION AND TRACKING IN VIDEO

(75) Inventors: Eitan Sharon, San Mateo, CA (US); Achi Brandt, San Mateo, CA (US)

(73) Assignee: Videosurf, Inc., San Mateo, CA (US)

( * ) Notice: Subject to any disclaimer, the term of this patent is extended or adjusted under 35 U.S.C. 154(b) by 1062 days.

This patent is subject to a terminal disclaimer.

(21) Appl. No.: 11/687,341

(22) Filed: Mar. 16, 2007

(65) Prior Publication Data

US 2008/0118108 A1  May 22, 2008

Related U.S. Application Data

(60) Provisional application No. 60/869,279, filed on Dec. 8, 2006, provisional application No. 60/866,552, filed on Nov. 20, 2006, provisional application No. 60/869,271, filed on Dec. 8, 2006.

(51) Int. Cl.
*G06K 9/00* (2006.01)
*G06K 9/34* (2006.01)
*G06K 9/46* (2006.01)
*G06K 9/66* (2006.01)
*G06K 9/68* (2006.01)
*G06K 9/62* (2006.01)

(52) U.S. Cl.
USPC ........... 382/103; 382/106; 382/107; 382/122; 382/123; 382/141; 382/151; 382/164; 382/173; 382/181; 382/190

(58) Field of Classification Search
None
See application file for complete search history.

(56) References Cited

U.S. PATENT DOCUMENTS

| | | | |
|---|---|---|---|
| 4,639,773 A | 1/1987 | Hurst | |
| 5,392,223 A | 2/1995 | Caci | |
| 5,410,643 A | 4/1995 | Yomdin et al. | |
| 5,473,384 A | 12/1995 | Jayant et al. | |
| 5,574,764 A | 11/1996 | Granfors et al. | |
| 5,638,135 A | 6/1997 | Mukai | |
| 5,838,838 A | 11/1998 | Overton | |

(Continued)

FOREIGN PATENT DOCUMENTS

| | | |
|---|---|---|
| CN | 1199449 C | 4/2005 |
| EP | 1152621 | 11/2001 |
| EP | 1732329 | 12/2006 |
| JP | 6105211 | 4/1994 |

OTHER PUBLICATIONS

International Search Report and Written Opinion issued for PCT/US2007/024197; Dated: May 19, 2008; 10 Pages.

(Continued)

*Primary Examiner* — Matthew Bella
*Assistant Examiner* — Thomas Conway
(74) *Attorney, Agent, or Firm* — Vierra Magen Marcus LLP

(57) ABSTRACT

A computer program and apparatus function to extract objects from a video by identifying regions to be tracked, tracking the regions across several frames, calculating motions of the regions, and identifying new regions to be tracked. Regions of a selected frame of the video that are appropriate for tracking are selected. Tracking of the identified regions is then performed across frames subsequent to the selected frame of the video. Motions of the identified regions are calculated, and new regions for tracking are identified.

25 Claims, 2 Drawing Sheets

U.S. PATENT DOCUMENTS

| | | | |
|---|---|---|---|
| 5,886,745 | A | 3/1999 | Muraji et al. |
| 5,923,775 | A | 7/1999 | Snyder et al. |
| 6,229,929 | B1 | 5/2001 | Lynch et al. |
| 6,370,543 | B2 | 4/2002 | Hoffert et al. |
| 6,396,948 | B1 | 5/2002 | Lynch et al. |
| 6,400,844 | B1 | 6/2002 | Fan et al. |
| 6,442,203 | B1 | 8/2002 | Demos |
| 6,449,608 | B1 | 9/2002 | Morita et al. |
| 6,462,768 | B1 | 10/2002 | Oakley |
| 6,611,296 | B1 | 8/2003 | Nieuwenhuizen et al. |
| 6,643,387 | B1* | 11/2003 | Sethuraman et al. ......... 382/107 |
| 6,714,929 | B1 | 3/2004 | Micaelian et al. |
| 6,718,365 | B1 | 4/2004 | Dutta |
| 6,766,037 | B1 | 7/2004 | Le et al. |
| 6,774,917 | B1 | 8/2004 | Foote et al. |
| 6,792,575 | B1 | 9/2004 | Samaniego et al. |
| 6,850,651 | B2 | 2/2005 | Zaklika et al. |
| 6,891,891 | B2 | 5/2005 | Pau et al. |
| 7,031,555 | B2 | 4/2006 | Troyanker |
| 7,042,527 | B2 | 5/2006 | Imai |
| 7,042,639 | B1 | 5/2006 | McDowell |
| 7,043,078 | B2 | 5/2006 | Guleryuz |
| 7,080,392 | B1 | 7/2006 | Geshwind |
| 7,120,195 | B2 | 10/2006 | Patti et al. |
| 7,136,524 | B1* | 11/2006 | Goh et al. ...................... 382/167 |
| 7,146,361 | B2 | 12/2006 | Broder et al. |
| 7,246,314 | B2 | 7/2007 | Foote et al. |
| 7,400,680 | B2 | 7/2008 | Jiang |
| 7,421,455 | B2 | 9/2008 | Hua et al. |
| 7,555,718 | B2 | 6/2009 | Girgensohn et al. |
| 7,603,342 | B2 | 10/2009 | Gosse et al. |
| 7,782,954 | B2 | 8/2010 | Liang et al. |
| 7,920,748 | B2 | 4/2011 | Sharon et al. |
| 8,009,897 | B2 | 8/2011 | Xu et al. |
| 8,059,915 | B2 | 11/2011 | Sharon et al. |
| 8,145,656 | B2 | 3/2012 | Shatz et al. |
| 8,233,545 | B2 | 7/2012 | Ahuja et al. |
| 2001/0049826 | A1 | 12/2001 | Wilf |
| 2002/0003900 | A1 | 1/2002 | Kondo |
| 2002/0114394 | A1 | 8/2002 | Ma |
| 2003/0088554 | A1 | 5/2003 | Ryan et al. |
| 2003/0097301 | A1 | 5/2003 | Kageyama et al. |
| 2003/0120652 | A1 | 6/2003 | Tifft |
| 2004/0013305 | A1 | 1/2004 | Brandt et al. |
| 2004/0081239 | A1 | 4/2004 | Patti et al. |
| 2004/0240725 | A1 | 12/2004 | Xu et al. |
| 2005/0050023 | A1 | 3/2005 | Gosse et al. |
| 2005/0069037 | A1 | 3/2005 | Jiang |
| 2005/0179814 | A1 | 8/2005 | Pau et al. |
| 2005/0216851 | A1 | 9/2005 | Hull et al. |
| 2005/0275626 | A1 | 12/2005 | Mueller et al. |
| 2006/0122997 | A1 | 6/2006 | Lin |
| 2006/0291567 | A1 | 12/2006 | Filippini et al. |
| 2007/0070226 | A1 | 3/2007 | Matusik et al. |
| 2007/0078832 | A1 | 4/2007 | Ott, IV et al. |
| 2007/0157239 | A1 | 7/2007 | Wang et al. |
| 2007/0185858 | A1 | 8/2007 | Lu et al. |
| 2008/0021710 | A1 | 1/2008 | Ho |
| 2008/0080743 | A1 | 4/2008 | Schneiderman et al. |
| 2008/0086688 | A1 | 4/2008 | Chandratillake et al. |
| 2008/0118107 | A1* | 5/2008 | Sharon et al. ................. 382/103 |
| 2008/0120290 | A1 | 5/2008 | Delgo et al. |
| 2008/0120291 | A1 | 5/2008 | Delgo et al. |
| 2008/0120328 | A1 | 5/2008 | Delgo et al. |
| 2008/0154889 | A1 | 6/2008 | Pfeiffer |
| 2008/0159622 | A1 | 7/2008 | Agnihotri et al. |
| 2008/0159630 | A1 | 7/2008 | Sharon et al. |
| 2008/0193017 | A1 | 8/2008 | Wilson et al. |
| 2008/0292187 | A1 | 11/2008 | Eitan et al. |
| 2008/0292188 | A1 | 11/2008 | Ettan et al. |
| 2009/0083228 | A1 | 3/2009 | Shatz et al. |
| 2009/0141940 | A1 | 6/2009 | Zhao et al. |
| 2010/0057694 | A1 | 3/2010 | Kunjithapatham et al. |
| 2010/0070483 | A1 | 3/2010 | Delgo et al. |
| 2010/0070523 | A1 | 3/2010 | Delgo et al. |
| 2010/0082585 | A1 | 4/2010 | Barsook et al. |
| 2010/0104261 | A1 | 4/2010 | Liu et al. |
| 2010/0205203 | A1 | 8/2010 | Anderson et al. |
| 2012/0008821 | A1 | 1/2012 | Sharon et al. |
| 2013/0016897 | A1 | 1/2013 | Cho et al. |

OTHER PUBLICATIONS

International Preliminary Report on Patentability and Written Opinion dated Jun. 4, 2009 directed at related application No. PCT/US2007/024198; 5 pages.

International Search Report mailed on Sep. 22, 2008 directed at counterpart application No. PCT/US2008/64683;1 page.

Delgo et al., U.S Office Action mailed on Dec. 29, 2008 directed at U.S. Appl. No. 11/687,300; 52 pages.

Delgo et al., U.S Office Action mailed on Dec. 29, 2008 directed at U.S. Appl. No. 11/687,326; 54 pages.

Delgo et al., U.S Office Action mailed on Dec. 22, 2008 directed at U.S. Appl. No. 11/687,290; 52 pages.

Delgo et al., U.S Office Action mailed on Jul. 8, 2009 directed at U.S. Appl. No. 11/687,290; 57 pages.

International Search Report and Written Opinion issued for PCT/US2007/024199; Dated: May 22, 2008; 9 pages.

"Object Classification by Statistics of Multi-scale Edges Based on BD Integrals", Anonymous CVPR submission, Paper ID 1413, 1-6.

Borenstein et al., "Combining Top-Down and Bottom-Up Segmentation", 2004 Conference on Computer Vision and Pattern Recognition Workshop, Jun. 2-27, 2004, 1-8.

Borenstein et al., "Combining Top-Down and Bottom-Up Segmentation", Proceedings IEEE workshop on Perceptual Organization in Computer Vision, IEEE Conference on Computer Vision and Pattern Recognition, Washington, DC, Jun. 2004.

Bourke, Intersection Point of Two Lnes (2 Dimensions), http://local.wasp.uwa.edu.au/~pbourke/geometry/lineline2d/, (Apr. 1989), 1-2.

Brandt et al., "Fast Calculation of Multiple Line Integrals"; SIAM J. Sci. Comput., 1999,1417-1429, vol. 20(4).

Cai et al., "Mining Association Rules with Weighted Items", Database Engineering and Applications Symposium, 1998. Proceedings. IDEAS'98. International, Jul. 8-10, 1998, 68-77.

Corso et al., "Multilevel Segmentation and Integrated Bayesian Model Classification with an Application to Brain Tumor Segmentation", Medical Image Computing and Computer- Assisted Intervention (MICCAI), 2006, Appeared in Springer's "Lecture Notes in Computer Science".

Galun et al., "Texture Segmentation by Multiscale Aggregation of Filter Responses and Shape Elements", Proceedings IEEE International Conference on Computer Vision, 716-723, Nice, France, 2003.

Gorelick et al., "Shape Representation and Classification Using the Poisson Equation", IEEE Transactions on Pattern Analysis and Machine Intelligence, Dec. 2006, 1991-2005, vol. 28(12).

Gorelick et al., "Shape Representation and Classification Using the Poisson Equation", Proceedings IEEE Conference on Computer Vision and Pattern Recognition, Washington, DC, Jun. 2004.

Lee et al., "A Motion Adaptive De-interfacing Method Using an Efficient Spatial and Temporal Interpolation", IEEE Transactions on Consumer Electronics, 2003, 1266-1271, vol. 49(4).

Lindley, "Creation of an MPEG-7 Feature Extraction Plugin for the platform METIS", Universität Wien/TU Wien, 2006, Betreuer: R. King, W. Klas.

Lucas et al., "An Iterative Image Registration Technique with an Application to Stereo Vision", Proceedings of Imaging Understanding Workshop, 1981, 121-129.

Sharon et al., "Completion Energies and Scale", IEEE Transactions on Pattern Analysis and Machine Intelligence, 2000, 1117-1131, vol. 22(10).

Sharon et al., "Fast Multiscale Image Segmentation" Proceedings IEEE Conference on Computer Vision and Pattern Recognition, I:70-77, South Carolina, 2000.

Sharon et al., "2D-Shape Analysis using Conformal Mapping", Division of Applied Mathematics, Brown University, 1-31.

Sharon et al., "2D-Shape Analysis using Conformal Mapping", International Journal of Computer Vision, Oct. 2006, 55-75, vol. 70(1).

Sharon et al., "2D-Shape Analysis using Conformal Mapping", Proceedings IEEE Conference on Computer Vision and Pattern Recognition, Washington, DC, 2004, 1-8.

Sharon et al., "Completion Energies and Scale", Proceedings IEEE Conference on Computer Vision and Pattern Recognition, 1997, 884-890, Puerto Rico.

Sharon et al., "Hierarchy and Adaptivity in Segmenting Visual Scenes", Nature, 2006, Jun. 28th online; Aug. 17th print, 1-4.

Sharon et al., "Segmentation and Boundary Detection Using Multiscale Intensity Measurements", Proceedings IEEE Conference on Computer Vision and Pattern Recognition, I:469-476, Kauai, Hawaii, 2001.

Shi et al., "Good Features to Track," 1994 IEEE Conference on Computer Vision and Pattern Recognition (CVPR'94), 1994, 593-600.

Tao et al., "Weighted Association Rule Mining using Weighted Support and Significance Framework", In: The Ninth ACM SIGKDD International Conference on Knowledge Discovery and Data Mining (ACM SIGKDD 2003), Aug. 24-27, 2003, Washington DC, USA.

Delgo et al., U.S Office Action mailed on Aug. 27, 2009, directed to U.S. Appl. No. 11/687,326; 58 pages.

Delgo et al., U.S Office Action mailed on Aug. 27, 2009 directed at U.S. Appl. No. 11/687,300; 56 pages.

International Search Report and Written Opinion mailed on Aug. 24, 2009 directed at application No. PCT/US2009/50409; 11 pages.

Polimeni, J. et. al., "Space-time Adaptive Image Representations: Data Structures, Hardware and Algorithms," in Defining a Motion Imagery Research and Development Program workshop,Virginia's Center for Innovative Technology: published Nov. 20, 2001, located at <http://eslab.bu.edu/publications/proceedings/2001/polimeni2001space-time.pdf> visited on Aug. 13, 2009. 23 pages.

Aji, et al. (2000). "The Generalized Distributive Law", *IEEE Transactions on Information Theory* 46(2):325-343.

Bhattacharyya. (1943)."On a measure of divergence between two statistical populations defined by their probability distributions", *Bulletin of the Calcutta Mathematical Society* 35: 99-109. MR0010358.

Sharon et al., U.S. Office Action mailed Jul. 9, 2010, directed to related U.S. Appl. No. 11/802,498; 8 pages.

Lowe, "Object recognition from local scale-invariant features". (1999).

Mikolajczyk et al., "A performance evaluation of local descriptors". (2005).

Ng et al., "On Spectral Clustering: Analysis and an algorithm," 2001. http://citeseerx.ist.psu.edu/viewdoc/summary?doi=10.1.1.19.8100.

Okuma et al., A boosted particle filter: Multi-target detection and tracking, ECCV, 2004. http://www.springerlink.com/content/wyf1nw3xw53xjnf3/.

Rabiner "A tutorial on Hidden Markov Models and selected applications in speech recognition". (Feb. 1989).

Viola et al., "Rapid object detection using a boosted cascacd of simple features," Proc. Computer Vision and Pattern Recognition, 2001.

Sharon et al., U.S. Office Action mailed Aug. 26, 2010, directed to U.S. Appl. No. 11/687,261; 25 pages.

Amendment dated May 30, 2012, in U.S. Appl. No. 11/687,261, filed Mar. 16, 2007.

Amendment dated Feb. 28, 2011, in U.S. Appl. No. 11/687,261, filed Mar. 16, 2007.

Notice of Allowance dated Jul. 11, 2012, in U.S. Appl. No. 12/502,202, filed Jul. 13, 2009.

Amendment dated May 23, 2012, in U.S. Appl. No. 12/502,202, filed Jul. 13, 2009.

Office Action dated Nov. 23, 2011, in U.S. Appl. No. 12/502,202, filed Jul. 13, 2009.

Amendment dated Sep. 23, 2011, in U.S. Appl. No. 12/502,202, filed Jul. 12, 2009.

Notice of Allowance dated Aug. 17, 2012, in U.S. Appl. No. 12/502,206, filed Jul. 13, 2009.

Amendment dated May 21, 2012, in U.S. Appl. No. 12/502,206, filed Jul. 13, 2009.

Office Action dated Nov. 21, 2012, in U.S. Appl. No. 12/502,206, filed Jul. 13, 2009.

Amendment dated Sep. 29, 2011, in U.S. Appl. No. 12/502,206, filed Jul. 13, 2009.

Notice of Allowance dated Sep. 24, 2012, in U.S. Appl. No. 11/687,261, filed Mar. 16, 2007.

Notice of Allowance dated Sep. 24, 2012, in U.S. Appl. No. 12/502,202, filed Jul. 13, 2009.

Notice of Allowance dated Sep. 27, 2012, in U.S. Appl. No. 12/502,206, filed Jul. 13, 2009.

U.S. Appl. No. 13/619,550, filed on Sep. 14, 2012.

Preliminary Amendment dated Dec. 28, 2012, in U.S. Appl. No. 13/619,550, filed Sep. 14, 2012.

Sharon et al., U.S. Office Action mailed Mar. 23, 2011, directed to U.S. Appl. No. 11/687,261; 12 pages.

Sharon et al., U.S. Office Action mailed Mar. 8, 2011, directed to U.S. Appl. No. 11/984,670; 6 pages.

Delgo et al., U.S. Office Action mailed Mar. 23, 2011, directed to U.S. Appl. No. 12/502,202; 42 pages.

Delgo et al., U.S. Office Action mailed Mar. 29, 2011, directed to U.S. Appl. No. 12/502,206; 17 pages.

Office Action dated May 9, 2013, in U.S. Appl. No. 13/104,793, filed May 10, 2011.

* cited by examiner

COMPUTER PROGRAM AND APPARATUS FOR MOTION-BASED OBJECT EXTRACTION AND TRACKING IN VIDEO

CROSS REFERENCE TO RELATED APPLICATIONS

This application claims priority under 35 U.S.C. §119(e) of U.S. Provisional Application Nos. 60/869,271 and 60/869,279 filed Dec. 8, 2006 and 60/866,552 filed Nov. 20, 2006 and is related to U.S. patent application Ser. No. 11/687,261 entitled Method of Performing Motion-Based Object Extraction and Tracking in Video by the inventors of the present application; and Ser. No. 11/687,290 entitled Apparatus for Performing a Weight-Based Search; Ser. No. 11/687,300 entitled Method of Performing a Weight-Based Search; Ser. No. 11/687,326 entitled Computer Program Implementing a Weight-Based Search by Lior Delgo et al. all of which non-provisional applications were filed on Mar. 16, 2007 contemporaneously herewith, all of the previously cited provisional and non-provisional applications being incorporated herein by reference in their entireties.

FIELD OF THE INVENTION

The invention relates to processing of video to identify salient objects and, in particular, using motion-based analysis to extract and track salient objects in time-space.

BACKGROUND OF THE INVENTION

Videos are composed of series of still images, each representing photometric qualities. To be useful in many applications, there is a need for automated correlation between these photometric features and physically cognizable objects, e.g., people, scenery, etc. Identification of physical objects may be accomplished by object extraction. With the proliferation of videos (e.g., on the Internet), there is an increasing need for efficient methods and apparatus for extracting objects to support object-based tagging and searching of videos.

SUMMARY OF THE INVENTION

According one aspect of the invention, a computer program includes a computer usable medium having computer readable program code embodied therein for extracting objects from a video. The computer readable program code may include computer readable program code for causing the computer to extract one or more objects from video content and/or to generate indexed video. According to one aspect of the invention, computer readable program code for causing a computer to identify regions to be tracked, track the regions across several frames, calculate motions of the regions, and identify new regions to be tracked. Although recited in a particular sequence, the steps and substeps performed by the computer program code are capable of rearrangement within the scope of the invention. Thus, according to one implementation, regions of a selected frame of the video that are appropriate for tracking are selected. Tracking of the identified regions is performed across frames subsequent to the selected frame of the video. Motions of the identified regions are calculated, and new regions for tracking are identified. Note that the term "video" is used herein in its broadest sense to include an electronically stored sequence of still images that represent scenes in motion and "video content" means image information stored in the form of a video.

According to an aspect of the invention, the computer readable program code for causing the computer to of identify new regions for tracking may be responsive to computer readable program code for causing the computer to calculate motions of the identified regions and/or track identified regions across frames. According to another aspect of the invention, the computer readable program code for causing the computer to identify regions of the selected frame may include said computer readable program code for causing the computer to segment at least one frame of the video to partition the frame into coherent regions and/or extract local motion estimations for various points in the selected frame across the frames subsequent to the selected frame.

According to another aspect of the invention, the computer readable program code for causing the computer to track identified regions across the frames subsequent to the selected frame may include computer readable program code for causing the computer to determine a motion of each of the identified regions of the selected frame across the frames subsequent to the selected frame.

According to another aspect of the invention, the computer readable program code for causing the computer to determine a motion of each of the identified regions may include computer readable program code for causing the computer to (i) fit the identified regions to the frames subsequent to the selected frame and/or (ii) estimate local motion within the selected frame.

According to another aspect of the invention, the computer readable program code for causing the computer to track identified regions across the frames subsequent to the selected frame may include computer readable program code for causing the computer to (i) determine whether a moveable object is trackable and/or (ii) determine whether one of the frames subsequent to the selected frame is substantially different from the selected frame.

According to other aspects of the invention, the computer readable program code for causing the computer to calculate motions of the identified regions may include computer readable program code for causing the computer to (i) determine a motion of each of the identified regions of the selected frame across the frames subsequent to the selected frame, (ii) group together ones of the identified regions based on their common motion to generate more complex regions of interest, (iii) determine a camera motion and factoring the camera motion out to identify salient objects that move differently from the camera motion, (iv) identify a salient object and continuing tracking of the salient object, and/or (iv) receive user input designating a salient object of interest.

According to another aspect of the invention, a computer program may include a computer usable medium having computer readable program code embodied therein for generating an indexed video. The computer readable program code may include computer readable program code for causing the computer to identify regions of a frame of the video appropriate for tracking, track the identified regions across subsequent frames of the video, calculate motions of the identified regions, identify coherent video objects, identify new regions for tracking in response to the calculated motions, create tubes that relate to the coherent video objects, and index and store the tubes in a searchable database.

According to another aspect of the invention, tracking may include generating tracking information and tube creation may include collecting the tracking information into space-time threads.

According to another aspect of the invention, tube creation may include identifying common salient objects and joining ones of the tubes of respective ones of the common salient objects.

According to another aspect of the invention, the computer readable program code may further include computer readable program code for causing the computer to analyze tube features to identify the weights and/or, tag and assign weights to each of the tubes.

According to another aspect of the invention, an apparatus for extracting objects from a video includes a local tracking engine configured to identify regions of a selected frame of the video appropriate for tracking. The local tracking engine may include a motion calculation engine. An interframe tracking engine receives the identified regions from the local tracking engine and identifies regions across frames subsequent to the selected frame of the video. The motion calculation engine calculates motions of the identified regions.

According to another aspect of the invention, an apparatus for generating an indexed video includes a frame segmentation engine configured to identify regions of a frame of the video appropriate for tracking; a tracking engine configured receiving and tracking the identified regions across subsequent frames of the video; a motion calculation engine configured to calculate motions of the identified regions and identify coherent video objects; an object recognition engine configured to create tubes that relate to the coherent video objects; and a searchable database configured to index and store the tubes.

Additional objects, advantages and novel features of the invention will be set forth in part in the description which follows, and in part will become apparent to those skilled in the art upon examination of the following and the accompanying drawings or may be learned by practice of the invention. The objects and advantages of the invention may be realized and attained by means of the instrumentalities and combinations particularly pointed out in the appended claims.

BRIEF DESCRIPTION OF THE DRAWINGS

The drawing figures depict preferred embodiments of the present invention by way of example, not by way of limitations. In the figures, like reference numerals refer to the same or similar elements.

DETAILED DESCRIPTION OF A PREFERRED EMBODIMENT OF THE INVENTION

The ensuing description provides exemplary embodiments only, and is not intended to limit the scope, applicability, or configuration of the invention. Rather, the ensuing description of the exemplary embodiments will provide those skilled in the art with an enabling description for implementing an example embodiment of the invention. It should be understood that various changes may be made in the function and arrangement of elements without departing from the spirit and scope of the invention.

Figure 1:
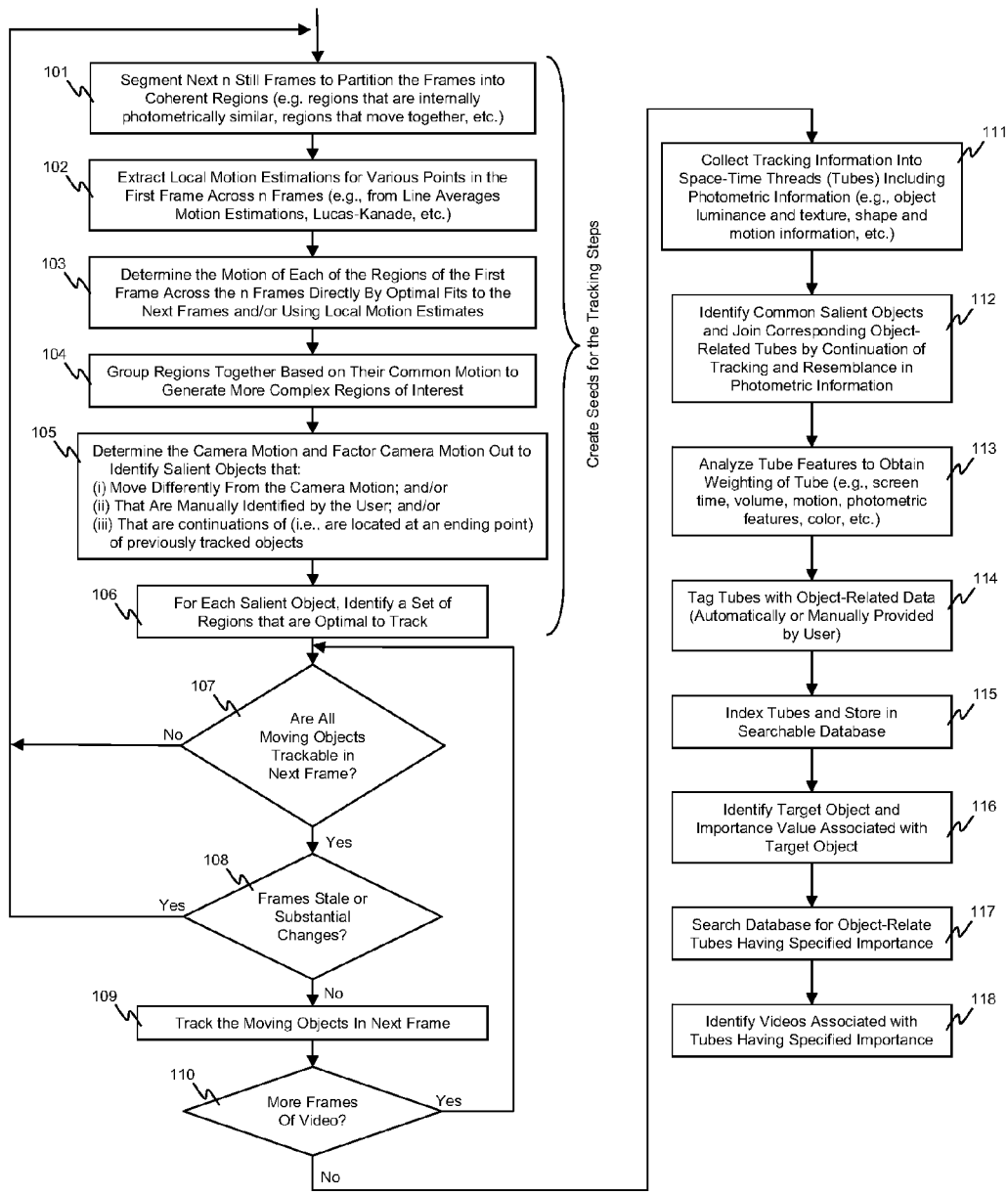
FIG. 1 is a flow diagram of a method according to an embodiment of the invention for extracting objects from a video, generating an indexed video and searching videos based on characteristics of the objects.

Referring to FIG. 1 of the drawings, a method according to an embodiment of the invention extracts objects from a video, generates an indexed video and searches videos based on characteristics of the objects. Initially the method creates seeds, i.e., takes a local view of a small number of frames to identify or create "seeds" in the form of salient objects that will be subject to tracking. Thus, at step 101 the next n (e.g., 2 or 3) frames are segmented so as to partition the frames into coherent regions, that is, regions having a common characteristic. For example, regions may be defined based on internally similar photometric characteristics (e.g., color, luminosity, texture, etc.), motion (regions of picture elements that move in a cohesive manner), etc. At step 102 local motions estimations are extracted for various points of a selected (e.g., first) frame across the n frames (i.e., the selected and some number of subsequent frames). Local motion estimations may be performed by techniques and methods such as, but not limited to, the formation of local line averages motion estimations, Lucas-Kanade, etc. At step 103 a determination is made of the motion of each of the regions defined in step 101 of the selected or first frame across the subsequent (e.g., n) frames. This may be performed by calculating motion between the frames by determining an optimal fit over geometric transformations of each of the regions to the next frame alone or in combination with local motion estimates obtained from step 102.

Using motion information from step 103, at step 104 those regions having common motion (e.g., moving in a cohesive manner or having motion consistent with the motion of some larger or more complex grouping of regions) are grouped together. For example, regions having a motion consistent with being part of a larger object may be grouped together to form more complex regions of interest. At step 105 the method corrects for apparent motion caused by changes of viewing position, e.g., camera motion, rather than by displacement of a region under examination. Thus, any camera motion is identified and "factored out" so that only motion of a region relative to a fixed reference point (e.g., a stationary background) is considered. Step 105 thusly identifies salient objects that move differently from the camera motion. In addition, step 105 provides for identification of salient objects as may be manually designated by a user (e.g., user identification by a mouse click of an interesting visual object that should be tracked) and continuation of tracking of salient objects for which tracking has been lost and/or needs adjustment. In the case of the latter two situations the method may tag the designated salient objects for extra scrutiny and/or special processing in an enhanced attempt to initiate and continue tracking. In the case of a lost or troubled track, step 105 may examine the ending point of an object for which tracking was lost in an attempt to reacquire tracking of the object based on new locally identified regions corresponding to the previously tracked object.

Once regions are grouped into salient objects, it may only be desirable or necessary to track some of the constituent regions rather than all those identified as constituting the object. Thus, at step 106, for each salient object, a set of regions is identified including those regions that are optimal for tracking purposes. Step 107 performs a test to determine if all moving objects in a next frame to be examined are trackable. For example, some regions or even entire objects may disappear from a subsequent frame, an object may be reoriented to a degree that constituent regions being tracked are no longer visible, or any other number and type of events may result in a previously tracked object becoming untrackable. In such cases, processing reverts back to step 101 to initiate creation of new seeds, i.e., local identification over some small set of n frames of trackable regions and their corresponding salient objects. Where reseeding is necessary, prior tracking history may be used to optimize identification of regions to be tracked.

If all moving objects remain trackable in a subsequent frame to be considered, then a second test is applied to determine if it is appropriate to, nonetheless, create new seeds. This may be desirable or necessary so as to identify new regions and/or objects that may have been introduced since tracking was last initiated. It may also be desirable to "reseed" the tracking process if the current frame is "stale", i.e., those regions and objects being tracked no longer represent optimal regions to be tracked in view of, for example, object movement, changes in lighting, interaction between and among objects, etc. If the current selection of regions and/or objects is stale (e.g., too old) or if substantial changes affecting tracking have occurred, then processing again reverts back to step 101. Otherwise, moving objects in the next frame are tracked at step 109. If still further frames of the video remain, then processing loops back to step 107 to continue tracking of the previously identified moving objects.

If all frames have been processed (i.e., the test at step 110 is passed), processing continues at step 111 to collect tracking information into space-time threads or "tubes". The intersection of each tube with a sequence of frames defines areas within each frame containing the selected moving objects previously processed, each tube spanning from the corresponding starting frame for which object tracking began through the ending frame at which tracking was terminated. Associated with each tube is information about the corresponding moving object including that derived from the previously described steps including, by way of example, object luminance and texture, shape, motion information, etc.

At step 112 processing is performed to identify common salient objects and thereby join corresponding object-related tubes. That is, tubes that are found to be associated and/or describe the same object may be joined to create one larger tube in time and/or space. This may be necessary, for example, because tracking of an object may have been lost at some point but reacquired in an immediately subsequent or some later frame (i.e., with no or some intervening frames).

Weighting of each tube is performed at step 113. Weighting may be, for example, a measure of the importance of a moving object. Various indicia of object importance may be considered including, for example, the amount of time or number of frames an object is tracked relative to total video length and/or in comparison to other tracked objects; the volume or space occupied within the frames by an object; amount, speed and nature of motion of the object; photometric features, object color, etc.

Tube (i.e., object) tagging is accomplished at step 114. That is, the corresponding object may be identified by giving it a name or other descriptive designation and/or associated with other information about the tube. Tagging may be accomplished by manual input by the user and/or by automatic recognition of the corresponding object.

At step 115 the tubes and associated object-related data may be indexed and stored in searchable database to complete generation of video indexing.

Steps 116 through 118 represent searching of the database for videos containing targeted objects appearing in the respective videos with a desired importance value. Thus, at step 116 a target object or objects are specified together with their associated importance values. The database is then searched at step 117 for videos having object-related tubes satisfying or most closely satisfying the search conditions, i.e., having (or not having) the target objects and corresponding importance values. The search concludes at step 118 with the identification of videos having or most closely matching the specified criteria.

Although a preferred embodiment of the invention has been described having a specified sequence of steps, other sequences are equally feasible. For example, the motion estimation of special points (e.g., Lucas-Kanade) could precede the segmentation in step 101 of any image and/or the tracking of special points in the image could precede the motion estimation in step 103. While the specified order of steps may be found to be efficient for a particular application and platform, other arrangements of steps may be optimized to other environments. More specifically, the sequence of steps 101 and 102 of FIG. 1 may be exchanged with no further changes being required. In addition, functions performed by some steps may be incorporated into other steps. For example, the functionality of step 101 may be embedded into step 104 given that the determination of motion estimation in step 103 would be replaced by the motion estimations provided by step 102.

Figure 2:
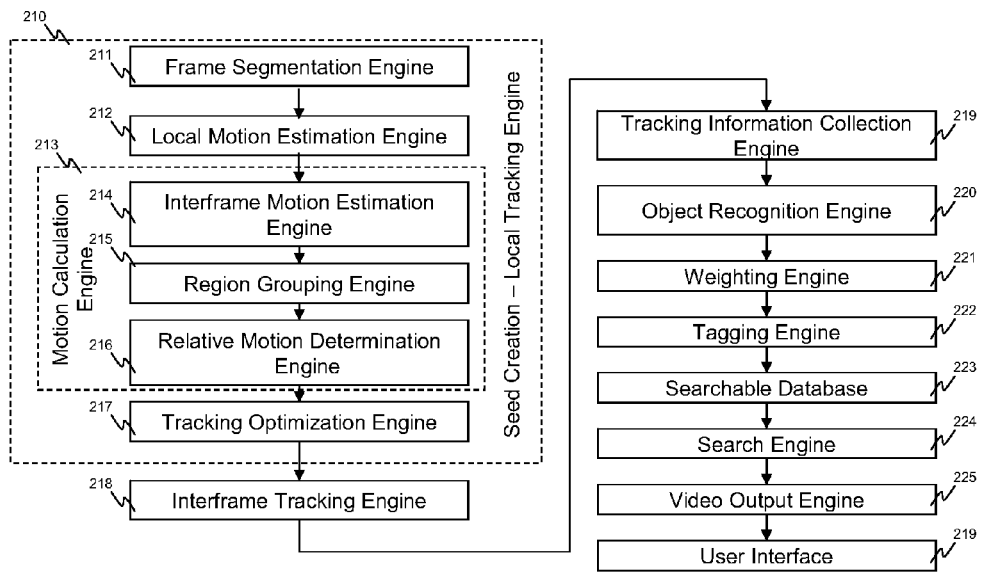
FIG. 2 is an apparatus according to an embodiment of the invention for executing software implementing procedures according to aspects and features of the invention.

FIG. 2 is a block diagram of an apparatus for extracting object from a video to generating an indexed video. Each of the component parts of the apparatus perform functions corresponding to those set forth in connection with the above described method and may be implemented in various forms including, for example, software modules, firmware, hardware and/or any combination thereof. Thus, a local tracking engine 210 includes software, firmware and devices for performing operations corresponding to steps 101-106 with reference to FIG. 1 to creates salient object seeds that will be subject to tracking. Frame segmentation engine 211 segments the next n (e.g., 2 or 3) frames to partition the frames into coherent regions. Local estimation engine 212 extracts motion estimations for various points of a first or later selected initial seed frame across the n frames. Motion estimation may take the form of various implementation including, but not limited to, the formation of local line averages motion estimations, Lucas-Kanade, etc. The result of the local motion estimation is then supplied to interframe motion estimation engine 214 of motion calculation engine 213. Interframe motion estimation engine 213 determines the motion of each of the regions defined by frame segmentation engine 211 for the selected or first frame across some small number of subsequent (e.g., n) frames. Again, this may be performed by calculating motion between the frames by determining an optimal fit over geometric transformations of each of the regions to the next frame alone or in combination with local motion estimates.

Using motion information from interframe motion estimation engine 214, region grouping engine groups those regions having common motion to generate more complex regions of interest. Relative motion determination engine corrects for apparent motion caused by changes of viewing position and identifies salient objects that move differently from the camera motion. Relative motion determination engine 216 may also provide a user interface (e.g., keyboard, mouse, etc.) to allow a user to manually designate and/or salient objects. Still another functionality that may be included is the capability of relative motion determination engine 216 to continue tracking of salient objects for which tracking has been lost and/or needs adjustment either by automatic recognition or manual operator input.

Once regions are grouped into salient objects by motion calculation engine 213, tracking optimization engine 217 identifies a set of regions for each object that is optimal for tracking purposes. However, if one or more of the objects being tracked is no longer trackable or if the frames used to create the seed are too old (e.g., "stale"), then tracking optimization engine initiates generation of a new seed by engines 211-216. Otherwise, moving objects in the next frame are tracked by interframe tracking engine 218.

Upon the tracking of all frames of a video by interframe tracking engine 218, tracking information collection engine 219 collects tracking information into space-time threads or "tubes". Object recognition engine 220 operates to identify common salient objects and thereby join corresponding object-related tubes. Weighing engine 221 assigns a weight to each tube based on one or more indicia of object importance such as the amount of time or number of frames an object is tracked, object size and/or color in the frame, etc. Tagging engine 222 tags the tube that is then indexed and stored in searchable database 223 to complete generation of video indexing.

Search engine 224 accepts a user or otherwise designated target object with corresponding importance value and searches searchable database 223 to identify videos containing the targeted objects with the desired importance value. Thus, at step 116 a target object or objects are specified together with their associated importance values. In response to user selection of one or more of the identified videos, the selected video(s) may be retrieved by video output engine 225 and provided to the user by user interface 219 (e.g., a personal computer.)

As before, the present embodiment has been described by way of example including one arrangement of components and sequence of processing. However, other arrangements and sequences are equally feasible. For example, local motion estimation engine 212 might be arranged prior to frame segmentation engine 211 with no further changes being required. In addition, functions performed by some engines may be incorporated into others. For example, the functionality performed by frame segmentation engine 211 might be embedded into region grouping engine 215 given that the determination of motion estimation performed by interframe motion estimation engine 214 might be replaced by the motion estimations provided by local motion estimation engine 212.

Figure 3:
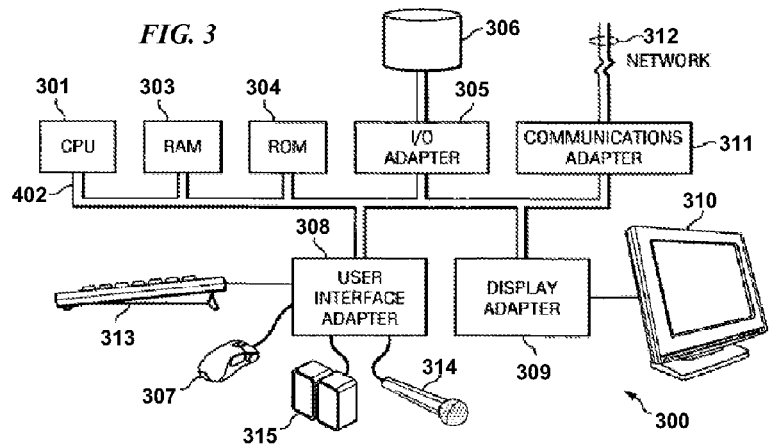
FIG. 3 is a block diagram of an exemplary computer system for executing a program set of instruction for performing object extraction and/or video indexing.

FIG. 3 illustrates an exemplary computer system 300 on which object extraction from video content and the generation of indexed video may be implemented according to one embodiment of the present invention. Central processing unit (CPU) 301 is coupled to system bus 302. CPU 301 may be any general purpose CPU. The present invention is not restricted by the architecture of CPU 301 (or other components of exemplary system 300) as long as CPU 301 (and other components of system 300) supports the inventive operations as described herein. CPU 301 may execute the various logical instructions according to embodiments of the present invention. For example, CPU 301 may execute machine-level instructions according to the exemplary operational flows described above in conjunction with FIGS. 1 and 2.

Computer system 300 also preferably includes random access memory (RAM) 303, which may be SRAM, DRAM, SDRAM, or the like. Computer system 300 preferably includes read-only memory (ROM) 304 which may be PROM, EPROM, EEPROM, or the like. RAM 303 and ROM 304 hold/store user and system data and programs, such as a machine-readable and/or executable program of instructions for object extraction and/or video indexing according to embodiments of the present invention.

Computer system 300 also preferably includes input/output (I/O) adapter 305, communications adapter 311, user interface adapter 308, and display adapter 309. I/O adapter 305, user interface adapter 308, and/or communications adapter 311 may, in certain embodiments, enable a user to interact with computer system 300 in order to input information.

I/O adapter 305 preferably connects to storage device(s) 306, such as one or more of hard drive, compact disc (CD) drive, floppy disk drive, tape drive, etc. to computer system 300. The storage devices may be utilized when RAM 303 is insufficient for the memory requirements associated with storing data for operations of the system (e.g., storage of videos and related information). Although RAM 303, ROM 304 and/or storage device(s) 306 may include media suitable for storing a program of instructions for object extraction and/or video indexing according to embodiments of the present invention, those having removable media may also be used to load the program and/or bulk data such as large video files.

Communications adapter 311 is preferably adapted to couple computer system 300 to network 312, which may enable information to be input to and/or output from system 300 via such network 312 (e.g., the Internet or other wide-area network, a local-area network, a public or private switched telephony network, a wireless network, any combination of the foregoing). For instance, users identifying or otherwise supplying a video for processing may remotely input access information or video files to system 300 via network 312 from a remote computer. User interface adapter 308 couples user input devices, such as keyboard 313, pointing device 307, and microphone 314 and/or output devices, such as speaker(s) 315 to computer system 300. Display adapter 309 is driven by CPU 301 to control the display on display device 310 to, for example, display information regarding a video being processed and providing for interaction of a local user or system operator during object extraction and/or video indexing operations.

It shall be appreciated that the present invention is not limited to the architecture of system 300. For example, any suitable processor-based device may be utilized for implementing object extraction and video indexing, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

While the foregoing has described what are considered to be the best mode and/or other preferred embodiments of the invention, it is understood that various modifications may be made therein and that the invention may be implemented in various forms and embodiments, and that it may be applied in numerous applications, only some of which have been described herein. It is intended by the following claims to claim any and all modifications and variations that fall within the true scope of the inventive concepts.

It should also be noted and understood that all publications, patents and patent applications mentioned in this specification are indicative of the level of skill in the art to which the invention pertains. All publications, patents and patent applications are herein incorporated by reference to the same extent as if each individual publication, patent or patent application was specifically and individually indicated to be incorporated by reference in its entirety.

The invention claimed is:

1. A non-transitory computer usable medium having computer readable program code embodied therein for extracting objects from a video, the computer readable program code including:
   computer readable program code for causing the computer to identify regions of a selected frame of the video appropriate for tracking movement of one or more salient objects appearing in the video;
   computer readable program code for causing the computer to track identified regions across frames subsequent to said selected frame of the video;
   computer readable program code for causing the computer to calculate motions of the identified regions including reacquiring tracking of a previously identified salient object for which tracking had been lost;
   computer readable program code for causing the computer to identify new regions for tracking;
   computer readable program code for causing the computer to collect tracking information related to the movement of the salient objects into one or more object-related tubes, each tube comprising a starting frame for which tracking of a salient object began though an ending frame at which tracking is terminated; and the code identifying common salient objects to join corresponding object-related tubes;
   computer readable program code for causing the computer to assign a weight to each object-related tube;
   computer readable program code for causing the computer to receive search criteria specifying a target object and identifying videos having object related tubes satisfying the search criteria; and
   computer readable program code for causing the computer to display videos having object-related tubes that match the target object and the corresponding weight associated with the target object.

2. The computer usable medium according to claim 1 wherein said computer readable program code for causing the computer to identify regions of a selected frame of the video appropriate for tracking includes computer readable program code for causing the computer to extract local motion estimations for various points in the selected frame across said frames subsequent to said selected frame.

3. The computer usable medium according to claim 1 wherein said computer readable program code for causing the computer to track said identified regions across said frames subsequent to said selected frame of the video includes computer readable program code for causing the computer determine whether a moveable object is trackable.

4. The computer usable medium according to claim 1 wherein said computer readable program code for causing the computer to track said identified regions across said frames subsequent to said selected frame of the video includes computer readable program code for causing the computer determine whether one of said frames subsequent to said selected frame is substantially different from said selected frame.

5. The computer usable medium according to claim 1 wherein computer readable program code for causing the computer to calculate motions of the identified regions includes computer readable program code for causing the computer determine a motion of each of the identified regions of the selected frame across said frames subsequent to said selected frame.

6. The computer usable medium according to claim 1 wherein said computer readable program code for causing the computer to calculate motions of the identified regions includes computer readable program code for causing the computer group together ones of said identified regions based on their common motion to generate more complex regions of interest.

7. The computer usable medium according to claim 1 wherein said computer readable program code for causing the computer to calculate motions of the identified regions includes computer readable program code for causing the computer determine a camera motion and factor said camera motion out to identify salient objects that move differently from said camera motion.

8. The computer usable medium according to claim 1 wherein said computer readable program code for causing the computer to calculate motions of the identified regions includes computer readable program code for causing the computer identify a salient object and continue tracking of said salient object.

9. The computer usable medium according to claim 1 wherein said computer readable program code for causing the computer to calculate motions of the identified regions includes computer readable program code for causing the computer to receiving user input designating a salient object of interest.

10. The computer usable medium according to claim 1 wherein each tube includes object related information including at least luminance, texture, shape, and motion information.

11. The computer usable medium according to claim 1 wherein the weight is determined based on at least one of any of:
   the amount of time or the number of frames by which the salient objects are tracked relative to the total video length in comparison to one or more other tracked objects;
   the volume or space occupied within the frames by the salient objects; and
   the amount, speed and nature of the salient objects.

12. The computer usable medium according to claim 1 wherein the computer readable program code tracks movement of multiple salient objects and the code causing the computer to collect tracking information related to the movement and information related to the multiple salient objects, and each tube includes tracking information related to the multiple salient objects.

13. The computer program usable medium according to claim 1 wherein said computer readable program code for causing the computer to track said identified regions across said frames subsequent to said selected frame of the video includes a step of determining a motion of each of the identified regions of the selected frame across said frames subsequent to said selected frame.

14. The computer usable medium according to claim 13 wherein said step of determining a motion of each of the identified regions includes computer readable program code for causing the computer fit said identified regions to said frames subsequent to said selected frame.

15. The computer usable medium according to claim 13 wherein said step of determining a motion of each of the identified regions includes computer readable program code for causing the computer estimate local motion within said selected frame.

16. An apparatus for extracting objects from a video comprising:
   a local tracking engine configured to identify regions of a selected frame of the video appropriate for tracking movement of one or more salient objects appearing in the video, said local tracking engine including a motion calculation engine; and an interframe tracking engine receiving said identified regions from said local tracking engine and configured to identify regions across frames subsequent to said selected frame of the video, said motion calculation engine is configured to calculate motions of the identified regions including reacquiring tracking of a previously identified salient object for which tracking had been lost, said motion calculation engine configured to:

identify new regions for tracking based on determining whether one or more previously tracked salient objects have become untrackable, changes in the movement of the salient objects, new salient objects and changes in interactions between the salient objects; and a tracking information collection engine, the tracking information collection engine collecting tracking information related to the movement of the salient objects into one or more object-related tubes, each tube comprising a starting frame for which object tracking began though an ending frame at which tracking was terminated; and identify common salient objects to join corresponding object-related tubes.

17. The apparatus according to claim 16 wherein said local tracking engine includes a frame segmentation engine configured to segment at least one frame of the video to partition the at least one frame into coherent regions.

18. The apparatus according to claim 16 wherein said local tracking engine includes a local motion estimation engine configured to extract local motion estimations for various points in the selected frame across said frames subsequent to said selected frame.

19. The apparatus according to claim 16 wherein said local tracking engine includes a motion calculation engine configured to determine a motion of each of the identified regions of the selected frame across said frames subsequent to said selected frame.

20. The apparatus according to claim 16 wherein said local tracking engine includes an interframe motion estimation engine configured to determine whether one of said frames subsequent to said selected frame is substantially different from said selected frame.

21. The apparatus according to claim 16 wherein said motion calculation engine includes an interframe calculation engine configured to determine a motion of each of the identified regions of the selected frame across said frames subsequent to said selected frame.

22. The apparatus according to claim 16 wherein said motion calculation engine includes a region grouping engine configured to group together ones of said identified regions based on their common motion to generate more complex regions of interest.

23. The apparatus according to claim 16 wherein said motion calculation engine includes a relative motion determination engine configured to determine a camera motion and factor said camera motion out to identify salient objects that move differently from said camera motion.

24. The apparatus according to claim 16 wherein said motion calculation engine includes a region grouping engine configured to identify a salient object and control tracking of said salient object.

25. The apparatus according to claim 16 wherein said motion calculation engine includes a user input device for receiving user input designating a salient object of interest.

* * * * *